(12) United States Patent
Macauda et al.

(10) Patent No.: US 10,498,143 B2
(45) Date of Patent: Dec. 3, 2019

(54) MONITOR SYSTEM AND MONITOR METHOD OF POWER GENERATION PLANTS

(71) Applicant: ABB Technology AG, Zurich (CH)

(72) Inventors: Andrea Macauda, Genoa (IT); Daniele Repetto, Genoa (IT); Pietro Ruggero, Genoa (IT)

(73) Assignee: ABB Schweiz AG, Baden (CH)

( * ) Notice: Subject to any disclaimer, the term of this patent is extended or adjusted under 35 U.S.C. 154(b) by 154 days.

(21) Appl. No.: 15/218,881

(22) Filed: Jul. 25, 2016

(65) Prior Publication Data

US 2017/0025863 A1 Jan. 26, 2017

(30) Foreign Application Priority Data

Jul. 23, 2015 (EP) .................................... 15178074

(51) Int. Cl.
| | |
|---|---|
| *G06F 11/00* | (2006.01) |
| *H02J 4/00* | (2006.01) |
| *G05B 15/02* | (2006.01) |
| *G05B 19/409* | (2006.01) |
| *H04L 29/06* | (2006.01) |

(52) U.S. Cl.
CPC ............... *H02J 4/00* (2013.01); *G05B 15/02* (2013.01); *G05B 19/409* (2013.01); *H04L 67/42* (2013.01)

(58) Field of Classification Search
None
See application file for complete search history.

(56) References Cited

U.S. PATENT DOCUMENTS

| | | |
|---|---|---|
| 2009/0132954 A1 | 5/2009 | Cupitt |
| 2009/0313569 A1 | 12/2009 | Gibson et al. |
| 2015/0177708 A1* | 6/2015 | McDonald ......... G05B 19/0423 700/52 |
| 2015/0193106 A1 | 7/2015 | Mann et al. |

OTHER PUBLICATIONS

European Search Report, EP15178074.9, ABB Technology AG, Jan. 25, 2016.

* cited by examiner

*Primary Examiner* — Paul B Yanchus, III
(74) *Attorney, Agent, or Firm* — Taft Stettinius & Hollister LLP; J. Bruce Schelkopf

(57) ABSTRACT

It is described a monitor and control system comprising: an input/output module structured to receive data/information associated with a power generation system; a human-machine interface device connected to the input/output module and configured to display a plurality of different view types representing different visualizations of the data/information and an operator interface application software module configured to run on said human-machine interface device and structured to: visualize a first view associated with a first view type by a first visualization process, and visualize a second view associated with a second view type different from the first view type by a second visualization process independent from the first process.

13 Claims, 6 Drawing Sheets

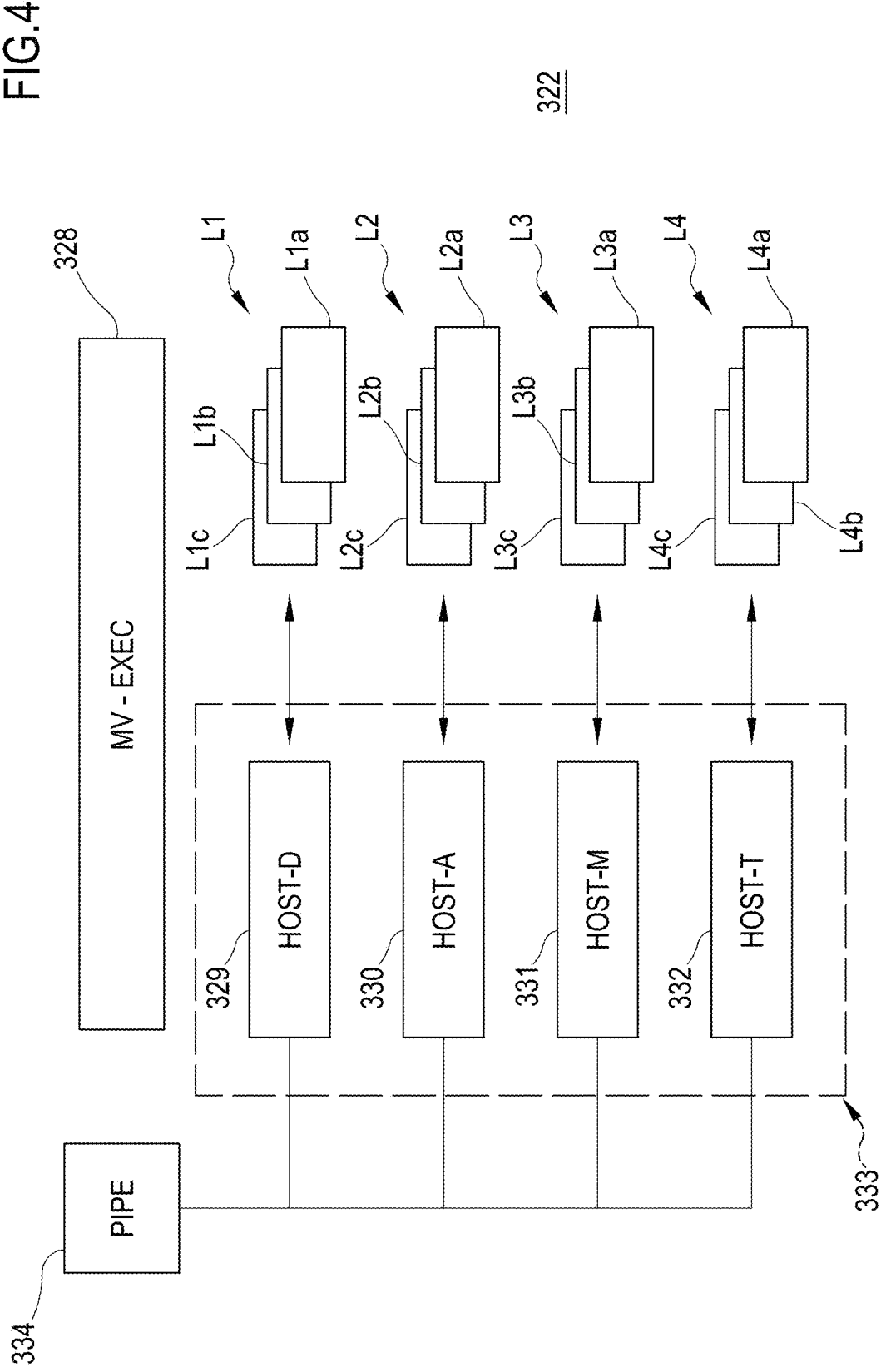

MONITOR SYSTEM AND MONITOR METHOD OF POWER GENERATION PLANTS

BACKGROUND

Technical Field

The present invention relates to monitor and control systems of power generation plants.

Description of the Related Art

In power generation plants several sensors are used to detect and monitor physical parameters (e.g. temperature, pressure) or general conditions of the plants area (e.g. presence of fires).

The detected data/information are made available to a human-machine interface apparatus (i.e. a computer) from which an operator monitors the status of the power generation plant and can send commands to actuators acting on the monitored plant. As an example, the Symphony Plus® system automation system, provided by ABB®, is a monitor and automation system for power and water industries.

Known human-machine interface apparatuses employ software applications that allow displaying, on one or more monitors, several views containing different types of graphical representations of the detected data/information, such as: alarm messages, parameter trends or plant operation mimics.

An efficient and continuous visualization of the data/information required by the operators ensure robustness of monitor and control system.

SUMMARY

The Applicant has noticed that improvements relating to the robustness of the monitor and control system can be obtained by reducing the effects of software anomalies (e.g. process crashes) occurring in the human-machine interface.

According to an embodiment of the invention, a monitor and control system is provided as depicted by the appended claim 1. Further embodiments of the apparatus are described by the dependent claims 2-11.

In accordance with another embodiment, a monitor and control method is defined by the independent claim 12; particular embodiments of the monitor and control method are described by the dependent claims 13-14.

BRIEF DESCRIPTION OF THE DRAWINGS

Further characteristics and advantages will be more apparent from the following description of preferred embodiment and of its alternatives given as a way of an example with reference to the enclosed drawings in which:

FIG. 4 shows an example of architecture of an interface application software module running on the human-machine interface;

FIG. 5 shows an example of architecture of a library employed by said interface application software module;

DETAILED DESCRIPTION

Figure 1:
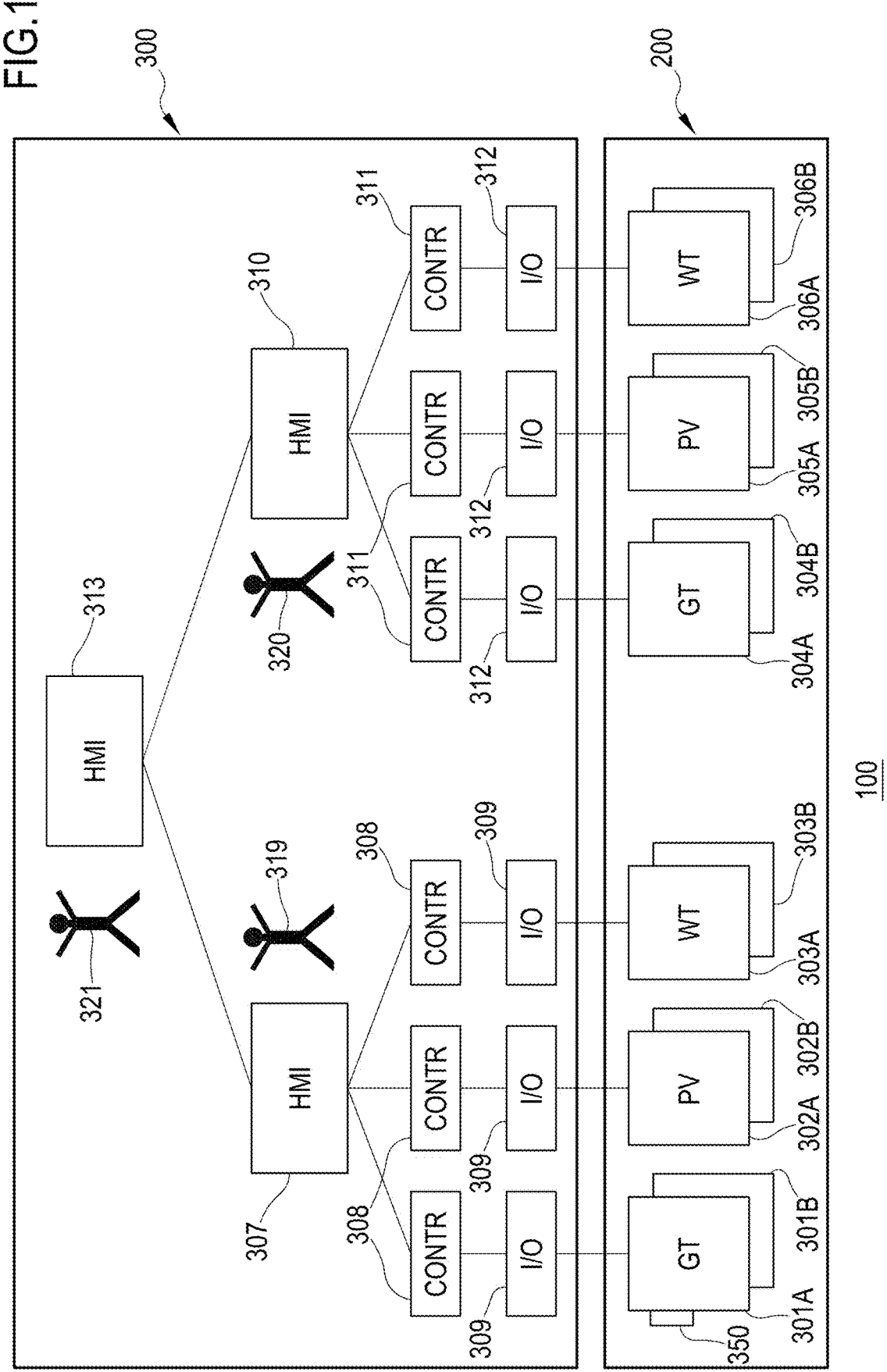
FIG. 1 schematically shows a particular embodiment of a monitoring and power generation system comprising a power generation system and a monitor and control system.

FIG. 1 schematically shows a monitoring and power generation system 100 comprising a power generation system 200 and a monitor and control system 300. The power generation system 200 comprises one or more units 301-306 structured to perform power generation.

As an example, the power generation system 200 includes: first and second group of gas turbine plants 301A-301B and 304A-304B (GT); first and second group of photovoltaic power generation plants 302A-302B and 305A-305B (PV); first and second group of wind power generation plants 303A-303B and 306A-306B (WT).

According to the example shown in FIG. 1, the monitor and control system 300 includes at least one first human-machine interface 307 (HMI) which is configured to monitor the first group of gas turbine plants 301A-301B; the first group of photovoltaic power generation plants 302A-302B and first group of wind power generation plants 303A-303B.

Moreover, the monitor and control system 300 includes first control modules 308 connected to the first human-machine interface 307, first input/output electronic modules 309 each connected to one plant of the first groups of plants 301A-301B, 302A-302B and 303A-303B.

Particularly, each first control module 308 includes a control and processing unit and is connected to the respective input/output electronic module 309 to exchange data or control signals via an input/output communication bus. The input/output electronic modules 309 can be electronic cards connected to sensor devices associated with the plants of the power generation system 200.

According to the particular embodiment shown in FIG. 1, the monitor and control system 300 also includes a second human-machine interface 310 (HMI) which is configured to monitor the second group of gas turbine plants 304A-304B; the second group of photovoltaic power generation plants 305A-305B and the second group of wind power generation plants 306A-306B.

The second human-machine interface 310 is connected to second control modules 311 which are connected to second input/output electronic modules 312, each connected to one plant of the second groups of plants 304A-304B, 305A-305B and 306A-306B.

Moreover, a third human-machine interface 313 can be connected to the first human-machine interface 307 and the second human-machine interface 310. According to the described example, the third human-machine interface 313 shows a hierarchical position which is superior to the ones assigned to the first human-machine interface 307 and the second human-machine interface 310.

Particularly, the monitor and control system 300 can be structured to implement a SCADA system, i.e. a Supervisory Control and Data Acquisition system.

As an example, the first gas turbine plant 301A is provided with a plurality of sensors 350 configured to detect electrical parameters, physical quantities or specific events associated with the gas turbine plant 301A, such as an example: electrical voltage, electrical current, temperature, pressure, flame presence, fire event etc.

The plurality of sensors 350 are provided with analog-to-digital converter modules which allow to send to the corresponding first input/output electronic module 309 digital data representing the detected values/events.

The first control module 308 is configured to transfer the received data to the first human-machine interface 307 and/or send control signals, generated according to a specific control logic stored into the first control module 308, towards the first gas turbine plant 301A. The second control modules 311 311 are analogous to the first control modules 308 and the second input/output electronic modules 312 are analogous to the first input/output electronic modules 309.

Figure 2:
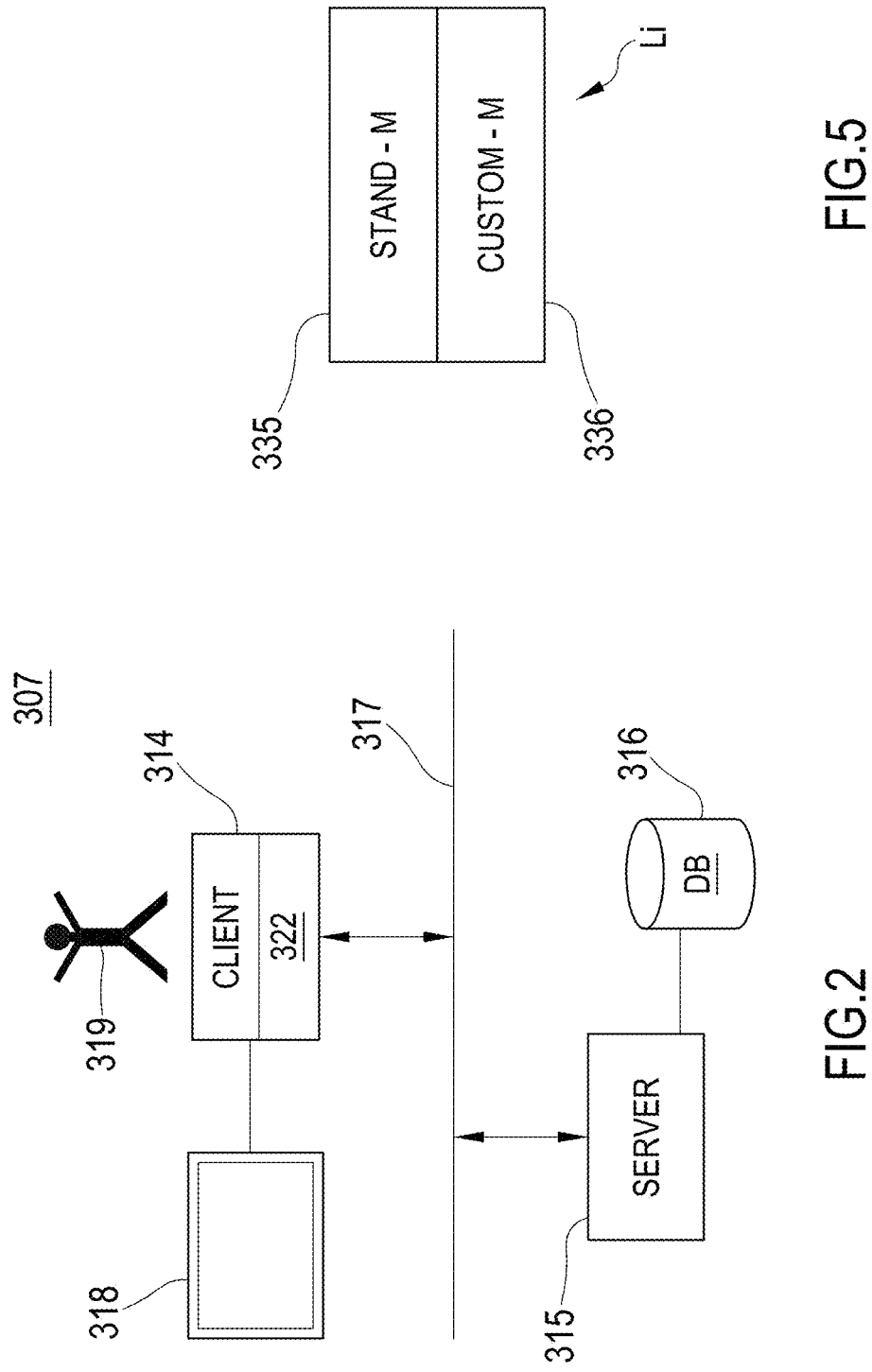
FIG. 2 shows an example of a human-machine interface employable in the and a monitor and control system of FIG. 1.

As shown in the example of FIG. 2 the first human-machine interface 307 preferably comprises a client computer 314, a server computer 315 and a database module 316 (DB). The server computer 315 is configured to cooperate with the first input/output electronic modules 309 and the first control modules 308 to receive data relating to the first groups of plants 301A-301B, 302A-302B and 303A-303B, processing such data and storing them in the database module 316. The client computer 314 can access the database module 316 to recover the data stored therein via a data bus 317.

It is observed that the first human-machine interface 307 can be provided with at least one further server computer according to a redundancy approach. The client computer 314 can be also connected to server computers belonging to other human-machine interfaces of the monitor and control system 300.

The first human-machine interface 307 and, particularly, the client computer 314 can be provided with at least one visualization module, such as a display device 318. Moreover, the client computer 314 is provided with operator interface apparatus such as a keyboard and/or a pointing device (not shown), as an example, the display device 318 comprises a touchscreen.

The first 307, the second 310 and the third human-machine interfaces 313 are provided with an operator interface application module 322 that allows first, second and third workplace operators 319-321 to interface to the monitor and control system 300.

Particularly, the operator interface application module 322, such as the one implemented into the client computer 314 of the first human-machine interface 307, is a software module configured to collect data and information from the database module 316, display such data and information on the display device 318, receive requests or commands by the first workplace operator 319 and send them to the server computer 315. The operator interface application module 322 can be also configured to allow the first workplace operator 319 acting on actuators associated with the first groups of plants 301A-301B, 302A-302B and 303A-303B.

In other words, the operator interface application module 322 represents a workplace to be used by the operators to interface the monitor and control system 300. With reference to the display of data/information, the operator interface application module 322 can manage the visualization of a plurality of View Types each having a specific purpose. Particularly, the following View Types are provided:
1) Diagnostic
2) Alarm
3) Mimic
4) Trend As known to the skilled person, a view is a result set of a specific query on data presented in a specific graphical way.

The View Type "Diagnostic" relates to the visualization (i.e. displaying) of data/information concerning the detection of failures or anomalies in the power generation system 200, including the first groups of plants 301-303.

The View Type "Alarm" relates to the visualization of alarm messages triggered by devices configured to detect situations in the first groups of plants 301-303 for which a particular attention by the first operator 319 is required.

The View Type "Mimic" relates to the visualization of graphic representation of the operation of specific portions of the first groups of plants 301-303.

The View Type "Trend" relates to the visualization of curves corresponding to the trends of physical parameters of the first groups of plants 301-303 (FIG. 1) to be monitored by the first operator 319.

Figure 3:
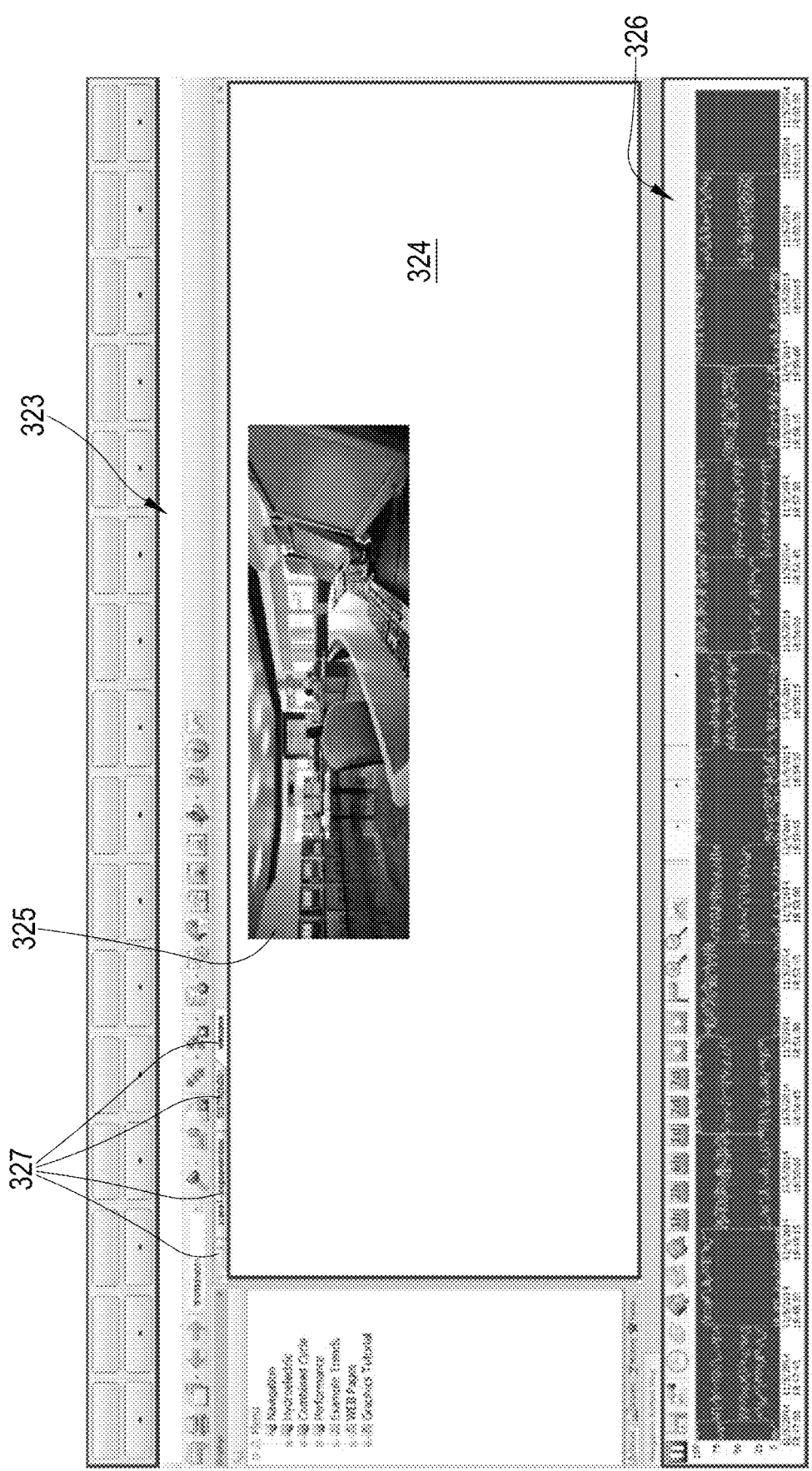
FIG. 3 shows particular views displayed on a display of the human-machine interface.

As an example, FIG. 3 shows several displayed views (i.e. data/information) that can be displayed on the display 318. A first displayed view 323 defines an area dedicated to alarm messages (no alarm message are shown in the given example), a second displayed view 324 refers to a welcome message showing, as an example, a digital image 325 of a possible monitoring room and a third displayed view 326 shows a plurality of selected parameter trends.

Particularly, it is possible to change the content of the second displayed view 324 by selecting a whished tab among tabs 327 (i.e., 1, scene1-popupwindow, TES-TREND01, welcome). The operator interface application module 322 allows the creation and visualization of the above mentioned views.

The operator interface application module 322 shows an architecture according to which the visualization of the views is made by independent processes. As it is known, a process is an instance of a computer program that is being executed and contains a program code and its current activity.

Each process associated with a specific view (e.g. View Type "Trend" and pressure and temperature as physical parameters) runs on a corresponding host view executable program (i.e. an executable file) which is controlled by the operator interface application module 322.

With reference to the executable programs, in accordance with the example depicted in FIG. 4 the operator interface application module 322 comprises a manager executable program 328 (MV-EXEC) and a plurality of independent host view executable programs 333. As an example, the plurality of independent host view executable programs 333 comprises a first host view executable program 329 (HOST-D), a second host view executable program 330 (HOST-A), a third host view executable program 331 (HOST-M) and a fourth host view executable program 332 (HOST-T).

The first host view executable program HOST-D is executed to visualize the views of Diagnostic Type and the second host view executable program 330 can be run to visualize the views of the Alarm Type. The third host view executable program 331 can be run to visualize the views of Mimic Type and the fourth host view executable program HOST-T can be run to visualize the views of the Trend Type.

Moreover, each of the plurality of independent host view executable programs 333 host a corresponding library among the plurality of group of libraries L1-L4, during execution. The plurality of group of libraries L1-L4 is stored into the database 316 and each group of libraries L1-L4 contains data relating to a specific View Type. Each library included in each single group of libraries L1-L4 refers to a specific information. As an example, the first group of library L4 refers to the view of the Trend Type and, particularly, a library L4a includes data necessary to represent a specific physical parameter trend (e.g. a temperature or an electrical voltage).

It is observed that thanks to the fact that the visualization of the Views is made by independent processes (performed by separated and independent executable programs) if one of such view undergoes an anomaly (e.g. the process crashes, hangs, does not respond or stops working) the other running Views are not affected by that anomaly: so a particular robustness of the monitoring and power generation system 100 is achieved.

Moreover, according to an embodiment, the operator interface application module 322 (particularly, the manager executable program 328) is configured to automatically (i.e. without a specific operator request) detect the anomaly affecting a visualization process (i.e. the process associated with the first, second, third or fourth host view executable programs 329, 330, 331 and 332), automatically close that process and automatically re-create a visualization of the view undergoing the anomaly.

Particularly, the manager executable program 328 is configured to send messages/requests to each program of the plurality of host view executable programs 333, as an example, via a pipe communication module 334. Particularly, the pipe communication module 334 can be the Microsoft® Pipe implementation.

As an example, manager executable program 328 can send, by means of the pipe communication module 334, to the third host view executable program 331 (HOST-M) a request asking for a refresh of a corresponding Mimic view.

With reference to FIG. 5 and in accordance with a specific embodiment, each library Li of the plurality L1-L4 shows a plug-in structure and comprises a standard portion module 335 (STAND-M) and a customizable portion module 336 (CUSTOM-M). The standard portion module 335 (STAND-M) allows to interface with the operator interface application module 322.

Particularly, the standard portion module 335 defines functionalities relating to the views, such as: open, refresh and/or displace a window. The customizable portion module 336 refers to a selected view, such as an example a Trend view, and, particularly, the one relating to a specific parameter.

Moreover, according to an embodiment, the customizable portion module 336 can be modified by a user/operator to embed View Types that are not predefined by the developers of the operator interface application module 322.

Particularly, the customizable portion module 336 is structured to allows adding different types of applications (e.g. any type of existing software applications) by embedding executable programs as one of the plurality of independent host view executable programs 333.

As an example, the manager executable program 328 (MV-EXEC) allows to visualize an Excel sheet as it was another view of the same manager executable program 328. In order to achieve this result, the manager executable program 328 connects the Excel sheet to one program of the independent host view executable programs 333.

Particularly, the involved program of the host view executable programs 333 can be also configured to remove an Excel titlebar from the view and add a toolbar of the operator interface application module 322, so showing to the workplace operator a full integration of the Excel view into the operator interface application module 322.

According to a particular embodiment, when the operator requests a first group of Views (e.g. Diagnostic and Mimic) not only the first host view executable program 329 (HOST-D) and the third host view executable program 331 (HOST-M) are launched, but also the second host view executable program 330 (HOST-A) and the fourth host view executable program 332 (HOST-T) are created (automatically) even if they are not displayed, i.e. the second 330 and the fourth host view executable program 332 are in a "ghost" form.

According to this particular method, if the operator wishes to replace, as an example, the Mimic view with a Trend view, the fourth host view executable program 332 (HOST-T) is already available for running and a loading process is not necessary, so obtaining improved performances in call up.

Particularly, the operator interface application module 322 is configured to mask for the operator that a plurality of independent processes (e.g. associated with a specific view), corresponding to separated executable programs, are implemented: the operator does not notice that a plurality of executable programs are running since the operator interface application module 322 appears to act by a single process.

It observed that the operator interface application software module 322 can be programmed using C++ programming language and the plurality of libraries L1-L4 can be defined MFC libraries (Microsoft Foundation Classes).

EXAMPLES

The Applicant has implemented a monitor and control system as the one described above. Particularly, the Applicant has modified the known system Symphony Plus automation system which is total plant automation for the power and water industries. More particularly, the Applicant has modified the prior art software PowerExplorer (i.e. an operator interface application module), implemented in the Symphony Plus automation system, by defining independent host view executable programs 333.

Figure 6:
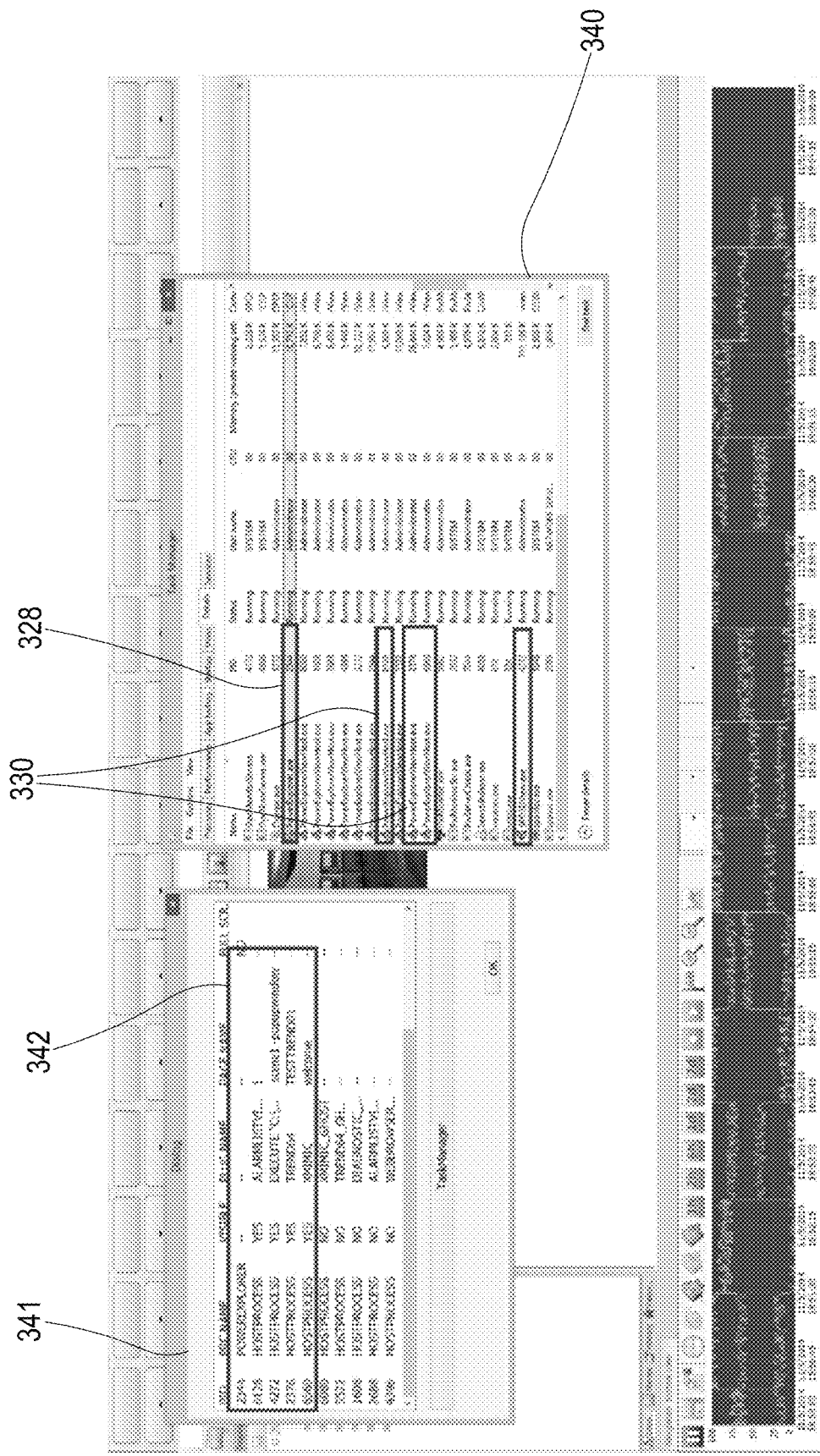
FIG. 6 shows the task manager view of a particular interface application software module realized.

FIG. 6 shows the task manager view 340 of the modified PowerExplorer (internal) from which independent host view executable programs 333 are recognizable: the files PowerExplorerViewHost.exe shows different identification numbers (PID). The file PowerExplore.exe corresponds to the above defined manager executable program 328. Moreover, the window Dialog 341 shows different processes HOST-PROCESS 342 relating to different View Types.

Figure 7:
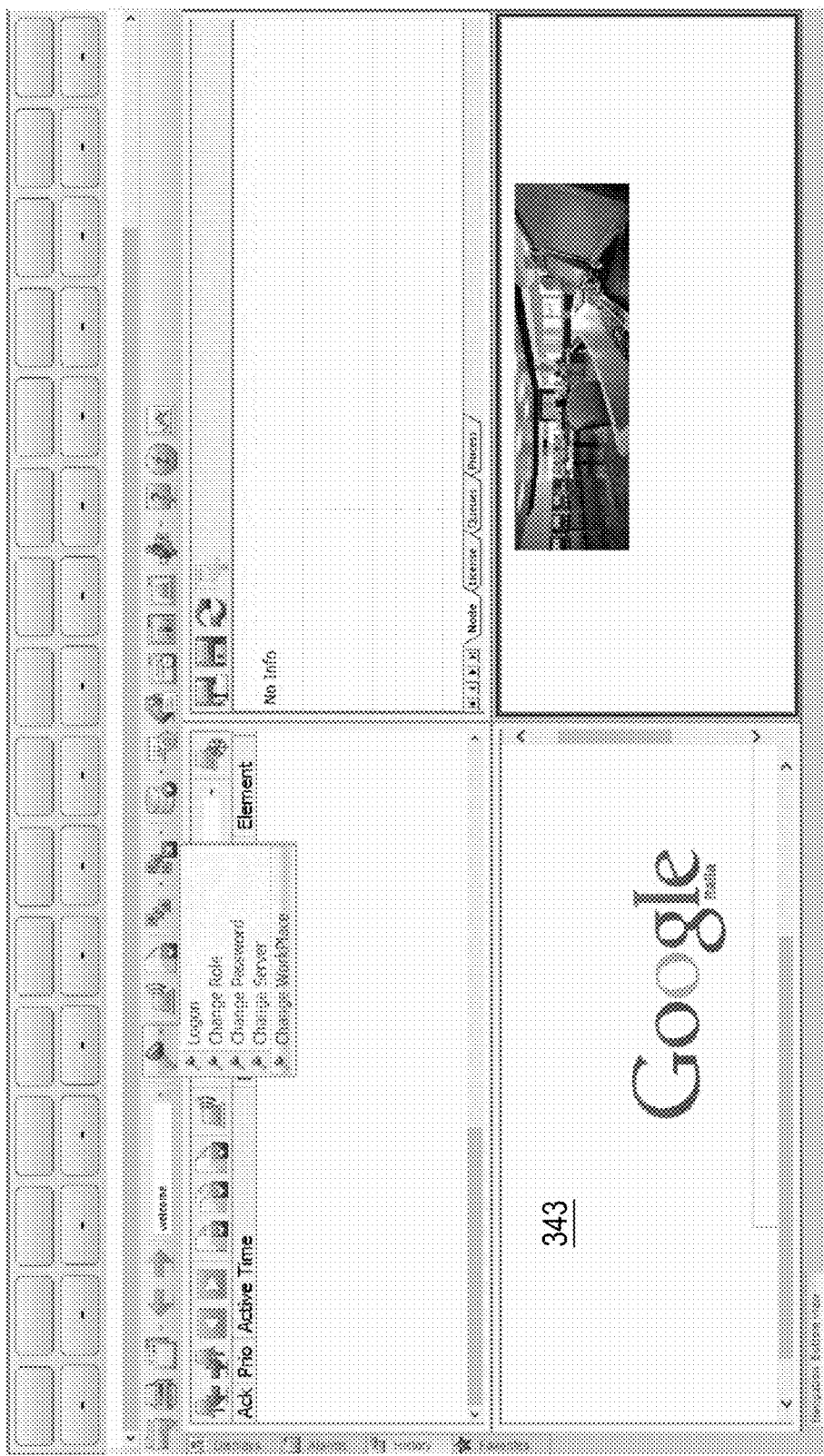
FIG. 7 shows an image of a view obtained by an implementation of said interface application software module.

FIG. 7 refers to the above described possibility of embedding views from other software application, in particular an HTML view (Google®) has been added to other views.

The invention claimed is:
1. A monitor and control system comprising:
an input/output module structured to receive data/information associated with a power generation system;
a human-machine interface device connected to the input/output module and configured to display a plurality of different view types representing different visualizations of the data/information;
an operator interface application software module configured to run on said human-machine interface device and structured to:
visualize a first view associated with a first view type by a first visualization process, and
visualize a second view associated with a second view type different from the first view type by a second visualization process independent from the first process;
wherein the operator interface application module is configured to:
associate said first visualization process with a first host view executable program;
associate said second visualization process with a second host view executable program independent from said first host view executable program; and wherein the operator interface application module is further configured such that, when the first host view executable program is launched, the second host view executable program is created and not displayed.

2. The monitor and control system of claim 1, wherein the operator interface application module comprises a manager executable program configured to:
   detect a process showing an anomaly among the first visualization process and the second visualization process;
   close the process showing an anomaly;
   create a further visualization process of the view associated with the process showing an anomaly.

3. The monitor and control system of claim 1, wherein the view types of the plurality of different view types are associate with at least one of the following data/information to be visualized: diagnostic data, alarm data, mimic data, trend data.

4. The monitor and control system of claim 1, wherein:
   the first host view executable program is configured to host a first library containing corresponding data structure related to the first view type;
   the second host view executable program is configured to host a second library containing corresponding data structure related to the second view type.

5. The monitor and control system of claim 1, wherein the operator interface application module is configured to allow embedding into the operator interface application module a further view type to be visualized.

6. The monitor and control system of claim 4, at least the first library shows a plug-in structure and comprises:
   a standard portion module configured to interface with the operator interface application module; and
   a customizable portion module configured to be modified by an operator to embed said further view type and/or graphical representation.

7. The monitor and control system of claim 1, wherein the operator interface application module is configured to:
   run the first host view executable program under an first operator request to visualize the first view;
   automatically run the second host view executable program without visualizing the second view; and
   visualize the second view under an second operator request by employing the running second host view executable program.

8. The monitor and control system of claim 1, further including a plurality of sensors structured to detect at least one of electrical parameters and physical quantities and events associated with the power generation system and provide said data/information to the input/output module.

9. The monitor and control system of claim 1, wherein said human-machine interface device comprises:
   a client computer;
   a server computer configured to receive request from the client computer;
   a database connected to the server computer and configured to store said data/information:
   a display connected to the client computer and configured to display the plurality of different view types.

10. The monitor and control system of claim 1, further including an electronic control module configured to:
    receive data/information associated with the power generation system;
    send control signals to the input/output module to perform actions on the power generation system.

11. A monitor and control method, comprising:
    receiving at human-machine interface device data/information associated with a power generation system;
    displaying at the human-machine interface device a first view, associated with said data/information, by running a first visualization process on said human-machine interface device, and
    displaying at the human-machine interface device a second view, associated with said data/information and different from the first view, by running a second visualization process on said human-machine interface device independent from the first process;
    wherein:
    displaying the first view comprises running a first host view executable program;
    displaying the second view comprises running a second host view executable program independent from said first host view executable program;
    wherein when the first host view executable program is launched, the second host view executable program is created and not displayed.

12. The monitor and control method of claim 11, further comprising:
    providing the human-machine interface device with a manager executable program;
    detecting, by means of the a manager executable program, a process showing anomaly among the first visualization process and the second visualization process;
    automatically closing, by means of the manager executable program, the process showing anomaly;
    automatically creating, by means of the manager executable program, a further visualization process of the view associated with the process showing anomaly.

13. The monitor and control system of claim 5, at least the first library shows a plug-in structure and comprises:
    a standard portion module configured to interface with the operator interface application module; and
    a customizable portion module configured to be modified by an operator to embed said further view type and/or graphical representation.

* * * * *